United States Patent
Chen et al.

(10) Patent No.: US 9,110,946 B2
(45) Date of Patent: Aug. 18, 2015

(54) DATABASE QUERY OPTIMIZATION

(71) Applicant: International Business Machines Corporation, Armonk, NY (US)

(72) Inventors: Dong Sheng Chen, Beijing (CN); Shu Hua Liu, Beijing (CN); Xin Ying Yang, Beijing (CN); Miao Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 13/846,019

(22) Filed: Mar. 18, 2013

(65) Prior Publication Data
US 2013/0262498 A1    Oct. 3, 2013

(30) Foreign Application Priority Data

Mar. 30, 2012    (CN) .......................... 2012 1 0092036

(51) Int. Cl.
*G06F 17/30*    (2006.01)
(52) U.S. Cl.
CPC ............................. *G06F 17/30442* (2013.01)

(58) Field of Classification Search
USPC ......................................... 707/713, 718, 719
See application file for complete search history.

(56) References Cited

U.S. PATENT DOCUMENTS

| 7,634,456 B2 | 12/2009 | Yagoub et al. | |
|---|---|---|---|
| 2005/0210023 A1* | 9/2005 | Barrera et al. | 707/5 |
| 2009/0327242 A1* | 12/2009 | Brown et al. | 707/3 |
| 2010/0036803 A1* | 2/2010 | Vemuri et al. | 707/2 |

* cited by examiner

*Primary Examiner* — Hung T Vy
(74) *Attorney, Agent, or Firm* — Cantor Colburn LLP (57) ABSTRACT

Embodiments relate to a system, computer program product and method for database query optimization. An aspect includes a method that extracts complex predicates from a query statement, the query statement having at least two complex predicates. The method then executes a query associated with the query statement and obtains at least a respective execution structure cost ($\Delta T_i$) for each of the complex predicates. The method also calculates an overall execution structure cost corresponding to each of the complex predicates, the complex predicates being arranged according to result of the query and the execution structure costs ($\Delta T_i$); and optimizes a database query by selecting the arrangement of complex predicates having a lowest overall execution structure cost.

19 Claims, 9 Drawing Sheets

Fig. 1

Query statement Q1:

**Select (\*) from Tab**

Where      Cpred1 and Cpred2 and Cpred3 and Cpred4 and Cpred5

| | Query statement | Query result | row vector of a complex predicate bitmap matrix, corresponding to the complex predicate |
|---|---|---|---|
| Trunk | Select (*) from Tab | 1 2 3 4 5 6 7 8 | |
| Combination of Complex Predicate 1 with the trunk | Select (*) from Tab where Cpred1 | 2 3 4 6 8 | [01110101] |
| Combination of Complex Predicate 2 with the trunk | Select (*) from Tab where Cpred2 | 1 2 4 5 7 8 | [11011011] |
| Combination of Complex Predicate 3 with the trunk | Select (*) from Tab where Cpred3 | 1 2 3 4 5 6 7 8 | [11111111] |
| Combination of Complex Predicate 4 with the trunk | Select (*) from Tab where Cpred4 | 1 2 7 8 | [11000011] |
| Combination of Complex Predicate 5 with the trunk | Select (*) from Tab where Cpred5 | 2 3 | [01100000] |

Fig. 2

Query statement Q2:

Select (*) from Tab

Where    Spred1 and Cpred1 and Cpred2 and Cpred3 and Cpred4 and Cpred5

|  |  | Query result | | | | | | | | | | row vectors with respect to query result of the trunk | | | | | | | |
|---|---|---|---|---|---|---|---|---|---|---|---|---|---|---|---|---|---|---|
|  |  |  |  |  |  |  |  |  |  |  |  | 1 | 2 | 3 | 4 | 5 | 6 | 7 | 8 |
| Trunk | Select (*) from Tab | 0 | 1 | 2 | 3 | 4 | 5 | 6 | 7 | 8 | 9 | | | | | | | | |
|  | Select (*) from Tab where Spred1 |  | 1 | 2 | 3 | 4 | 5 | 6 | 7 | 8 |  | | | | | | | | |
| Complex Predicate 1 | Cpred1 |  |  | 2 | 3 | 4 |  | 6 |  | 8 |  | 0 | 1 | 1 | 1 | 0 | 1 | 0 | 1 |
| Complex Predicate 2 | Cpred2 |  | 1 | 2 |  | 4 | 5 |  | 7 | 8 |  | 1 | 1 | 0 | 1 | 1 | 0 | 1 | 1 |
| Complex Predicate 3 | Cpred3 |  | 1 | 2 | 3 | 4 | 5 | 6 | 7 | 8 |  | 1 | 1 | 1 | 1 | 1 | 1 | 1 | 1 |
| Complex Predicate 4 | Cpred4 |  | 1 | 2 |  |  |  |  | 7 | 8 |  | 1 | 1 | 0 | 0 | 0 | 0 | 1 | 1 |
| Complex Predicate 5 | Cpred5 |  |  | 2 | 3 |  |  |  |  |  |  | 0 | 1 | 1 | 0 | 0 | 0 | 0 | 0 |

Fig. 3

$$B = \begin{bmatrix} 01110101 \\ 11011011 \\ 11111111 \\ 11000011 \\ 01100000 \end{bmatrix}$$

Fig. 4

$$\Delta T = \begin{bmatrix} \Delta T_1 & \Delta T_2 & \Delta T_3 & \Delta T_4 & \Delta T_5 \end{bmatrix}$$

Fig. 5

$$\begin{bmatrix} 0 & 1 & 1 & 1 & 0 & 1 & 0 & 1 \\ 1 & 1 & 0 & 1 & 1 & 0 & 1 & 1 \\ 1 & 1 & 1 & 1 & 1 & 1 & 1 & 1 \\ 1 & 1 & 0 & 0 & 0 & 0 & 1 & 1 \\ 0 & 1 & 1 & 0 & 0 & 0 & 0 & 0 \end{bmatrix}$$

$$\Rightarrow \quad C = \begin{bmatrix} C_1 \\ C_2 \\ C_3 \\ C_4 \\ C_5 \end{bmatrix} = \begin{bmatrix} 0 & 1 & 1 & 1 & 0 & 1 & 0 & 1 \\ 0 & 1 & 0 & 1 & 0 & 0 & 0 & 1 \\ 0 & 1 & 0 & 1 & 0 & 0 & 0 & 1 \\ 0 & 1 & 0 & 0 & 0 & 0 & 0 & 1 \\ 0 & 1 & 0 & 0 & 0 & 0 & 0 & 0 \end{bmatrix} \quad \Rightarrow \quad \sigma = \begin{bmatrix} \sigma_1 \\ \sigma_2 \\ \sigma_3 \\ \sigma_4 \\ \sigma_5 \end{bmatrix} = \begin{bmatrix} 5 \\ 3 \\ 3 \\ 2 \\ 1 \end{bmatrix}$$

Fig. 6

$$T = \Delta T \bullet \sigma = \begin{bmatrix} \Delta T_1 & \Delta T_2 & \Delta T_3 & \Delta T_4 & \Delta T_5 \end{bmatrix} \bullet \begin{bmatrix} \sigma_1 \\ \sigma_2 \\ \sigma_3 \\ \sigma_4 \\ \sigma_5 \end{bmatrix}$$

Fig. 7

EXEC SQL DECLARE CUR CURSOR FOR
SELECT * FROM DSN8910.EMP;
   WHERE YEAR(HIREDATE) <= 2005
         AND FIRSTNME > LASTNME

Cped1 → YEAR(HIREDATE) <=2005
Cped2 → FIRSTNME > LASTNME

Fig. 8

| | | Cped1 | | Cped2 |
|---|---|---|---|---|
| $\Delta T_1$ | | 0.15 ms | $\Delta T_2$ | 0.03ms |
| | | | | |
| | | Cped1 → Cped2 | | Cped2 → Cped1 |
| $\sigma_{1\rightarrow 2} = \begin{bmatrix} \sigma_1 \\ \sigma_2 \end{bmatrix}$ | | $\begin{bmatrix} 1000 \\ 10 \end{bmatrix}$ | $\sigma_{2\rightarrow 1} = \begin{bmatrix} \sigma_2 \\ \sigma_1 \end{bmatrix}$ | $\begin{bmatrix} 10 \\ 1000 \end{bmatrix}$ |
| $T_{1\rightarrow 2} = [\Delta T_1 \quad \Delta T_2] \bullet \begin{bmatrix} \sigma_1 \\ \sigma_2 \end{bmatrix}$ | | 1.5003 s | $T_{2\rightarrow 1} = [\Delta T_2 \quad \Delta T_1] \bullet \begin{bmatrix} \sigma_2 \\ \sigma_1 \end{bmatrix}$ | 0.0045s |

DATABASE QUERY OPTIMIZATION

PRIORITY

The present application claims priority to European application number 201210092036.8 filed Mar. 30, 2012 and all benefits accruing therefrom under U.S.C. §119, the contents of which is incorporated herein in its entirety.

BACKGROUND

The present invention generally relates database management, and more particularly to optimization of database queries.

Mainstream database systems provide a relational data service (RDS). An RDS process parses a database query statement (hereinafter referred to as a query statement, or simply a query) and performs query semantic transformation (QST) according to the parsed results. Here, rewriting may also be performed on the query statement. Then, the RDS process may perform access path selection (i.e. APS evaluation) according to the QST processed query and generate an access specific language for an executive structure generator to generate execution structure. A database engine (or executive or execution modules thereof) will execute the query based on the executive/execution structure so as to obtain a query result.

Queries can be divided into simple and complex predicate queries. A predicate contains an argument, an operation relational operator or a logic operator and a constant in this order. When the variable does not contain a function, expression or sub-statement, the predicate is called a simple predicate. Complex predicates, by contrast, can contain a variable, a function, an expression, a sub-statement or the like. In a database language, relational operators or logic operators can comprise "=", ">", ">=", "<", "<=", "NOT", "IN", "LIKE", "BETWEEN", or the like. Typical examples of simple predicates can include, but are not limited to, COL op values, COL IS NULL, COL IS NOT NULL, COL BETWEEN value1 AND value2, COL<>value, COL NOT BETWEEN value1 AND value2 and the like where the "op" represents "=", ">", ">=", "<", "<=" and "value", "value1" and "value2" are constants.

BRIEF SUMMARY

Embodiments include a system, program product and method for database query optimization that extracts complex predicates from a query statement, the query statement having at least two complex predicates. The method further executes a query associated with the query statement and obtains at least a respective execution structure cost ($\Delta T_i$) for each of the complex predicates. The method also calculates an overall executable structure cost corresponding to each of the complex predicates, the complex predicates being arranged according to result of the query and the executable structure costs ($\Delta T_i$); and optimizes a database query by selecting the arrangement of complex predicates having a lowest overall executable structure cost.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

FIG. 10 depicts a diagram illustrating an optimization (rewrite) of a query statement with respect to the example provided in the embodiment of FIG. 8;

DETAILED DESCRIPTION

Traditionally, some rewriting technologies are provided with respect to simple predicate query such as predicate re-distributing technology and real-time statistical refining technology. However, these technologies are either simple predicate query rewriting technologies or not related to complex predicate manipulation. In addition, these do not focus on complex predicates, especially those that provide rewriting optimization.

Perhaps this is partly because when certain types of query statements are executed repeatedly and with a high probability (for example, not in a buffer repository), the executive/execution efficiency is not desirable. Particularly, when these statements have a same trunk (while for example only a part of the predicates are different) the solution has less efficiency.

The embodiment provided in the figures will be discussed. According to one embodiment of the present disclosure, a method for database query optimization is provided that includes extracting complex predicates from a query statement. In this embodiment, the query statement has at least two complex predicates. The query associated with the query statement is executed and the respective executive or execution structure cost ($\Delta T_i$) (hereinafter referenced as execution structure cost) of each of the complex predicates is obtained. In addition, an overall execution structure cost corresponding to each arrangement of the complex predicates according to result of the query and the executive/executable structure costs (ΔT_i) is calculated and an arrangement is selected having the lowest overall executable structure cost for optimizing database query.

According to another embodiment, a system for database query optimization is provided having extraction means configured to extract complex predicates from a query statement. The query statement includes at least two complex predicates. In addition, execution means is provided configured to execute a query associated with the query statement. An execution structure cost is also provided for obtaining means configured to obtain respective executive/executable structure cost (ΔTi) of each complex predicate. Furthermore, calculation means is provided and configured to calculate an overall execution structure cost corresponding to each arrangement of the complex predicates according to result of the query and the execution structure costs (ΔTi); and selection means configured to select an arrangement having the lowest overall execution structure cost for optimizing database query. According to another embodiment, real-time feedback information can be provided when executing a query. Moreover, the real-time feedback information can be collected in a database engine or outside a database engine, thereby providing a considerable flexibility. In addition, the techniques provided can optimize a query statement based on history feedback information, which enhances query statement rewriting flexibility and reduces query response time. Furthermore, the techniques also provide for rewriting of query statements according to real-time feedback and without re-binding.

Figure 1:
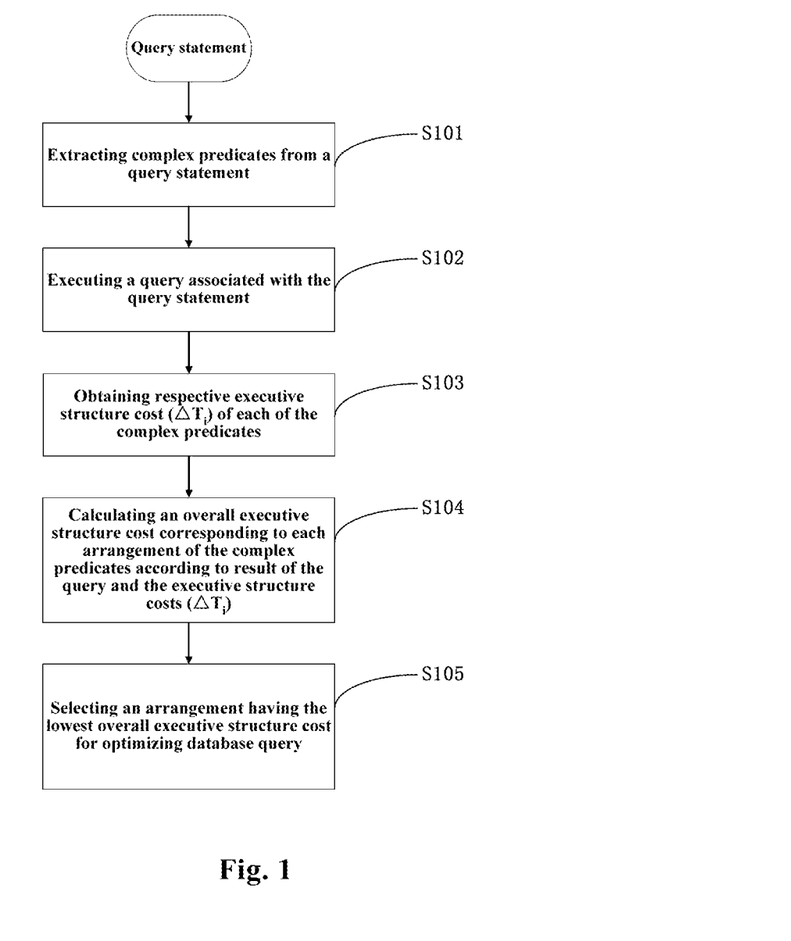
FIG. 1 is an illustration of a flowchart depicting a query method according to one embodiment.

FIG. 1 is a flowchart depicting illustration a method according to one embodiment of the present disclosure that address the above mentioned problems. According to the method of the present disclosure, in step S101, complex predicates are extracted from a database query statement received (hereinafter, referred to as a query statement or a first query statement).

Figure 2:
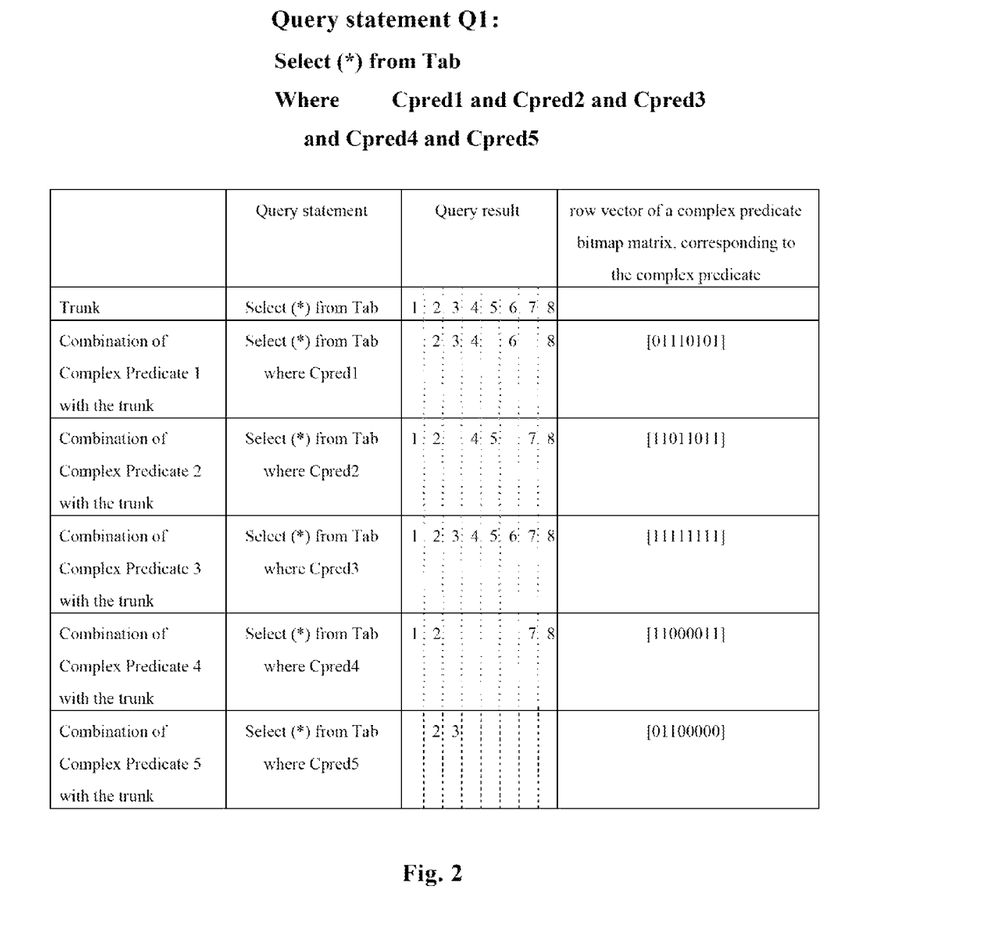
FIG. 2 is an illustration depicting an example of a detailed implementation according to one embodiment.

FIG. 2 is a depiction of an example illustrating a query statement. In FIG. 2 a query statement Q1 is provided. FIG. 2 illustrates an example of a query statement Q1:

Select (*) from Tab
  Where Cpred$_1$ and Cpred$_2$ and Cpred$_3$
  and Cpred$_4$ and Cpred$_5$ The statement can be provided in the following manner Q1:

Select (*) from Tab
  Where Cpred1 and Cpred2 and Cpred3 and Cpred4 and Cpred5
  Wherein, Cpred1 through Cpred5 represent complex predicates.

In this case, the remaining part of a query statement after complex predicates are extracted is referred as a "trunk". For the above-mentioned query statement, the trunk is "Select (*) from Tab". Those skilled in the art will understand that the trunk also may comprise, for example, simple predicates, other conditional statements, sub-query, or the like.

In this example, complex predicates Cpred1 to Cpred5 are shown as having a logic AND relation with each other; however, it should be understood that the present invention is not limited thereto. In addition, it should be understood that the query statement as used herein can be an original query statement, or can be a semantically transformed statement equivalent to the original query statement or a part thereof, so long as the query statement has at least two complex predicates. The present disclosure is particularly applicable to query statements having two or more complex predicates which have logic AND relations with each other; however, the present invention is not limited thereto. In the present disclosure, if not otherwise specified, the logic relation among the involved complex predicates can be AND. In other cases, the logic relation among complex predicates may also be extracted in step S101.

In step S102, the query associated with the first query statement is executed. According to an embodiment of the present disclosure, query can be executed with respect to the trunk and with respect to the respective combination of each of the complex predicates with the trunk, as shown in FIG. 2. For example, it is possible to generate query statements corresponding to the trunk and the respective combination of each of the complex predicates with the trunk, by means of a tool (e.g. program or module) outside the database engine, and then queries can be performed with respect to these query statements generated. FIG. 2 schematically illustrates respective query results thereof. For example, a query result corresponding to the trunk "Select (*) from Tab" is "1, 2, 3, 4, 5, 6, 7, 8". That is, the database object (table) Tab, to which this statement is directed, has eight data records (e.g. rows in the table): 1 through 8. The trunk is combined respectively with the complex predicates Cpred1 through Cpred5, thus, corresponding query results can be obtained, respectively, as shown in FIG. 2.

Figure 3:
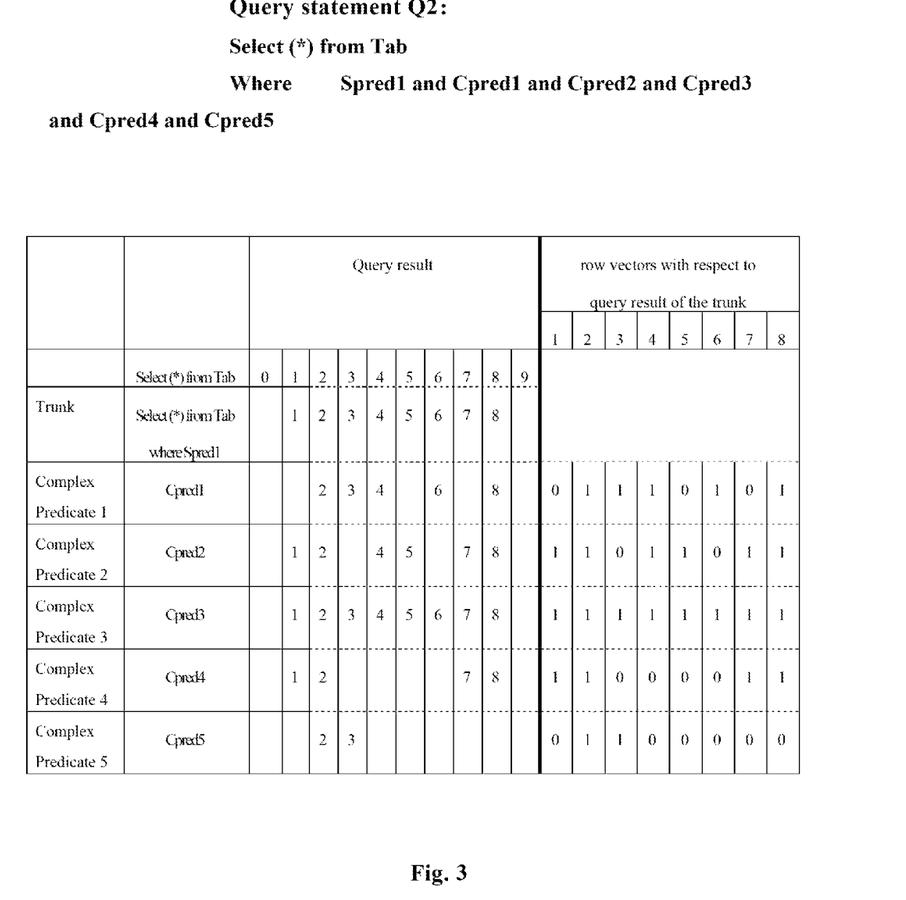
FIG. 3 is depicts an implementation of one specific example according to one embodiment.

According to another embodiment, query can be executed with respect to the first query statement itself. The query can be executed in the database engine, for example. In an implementation, the first query statement can be applied to each data record (row) in the database object. FIG. 3 provides a schematic illustration of such an example as will be discussed in detail later.

In step S103, corresponding execution structure cost (ΔTi) of each complex predicate (Cpredi) is obtained. Here, the execution structure cost (ΔTi) is a response time for applying the complex predicate Cpredi to one data record (also referred to as row or tuple) in the specific database object (e.g. table) to which the query statement is directed. Those skilled in the art will understand that the response time can include time for fetching or duplicating the data record, determining whether or not it satisfies the complex predicate, and the like. Here, for the aforementioned query statement Q1, i is 1 to 5. Such execution structure cost can also be referred as atomic cost.

According to one embodiment, the execution structure cost can be estimated based on the execution structure for a query. For example, those skilled in the art will understand that the database engine can make analysis according to the execution structure generated by the execution structure generating module for the query statement, so as to obtain execution structure costs corresponding to each of the predicates. That is, the estimation can be performed off-line, i.e., at the bind time.

Alternatively, the execution structure cost can be obtained based on the execution of the query in step S102, that is, such execution structure cost is a real response time in execution. That is, it is performed on-line, i.e., at the executing time. Thus, although the step S103 herein is shown as after the execution of query in step S102, the present disclosure is not limited as can be appreciated to those skilled in the art.

In step S104, an overall execution structure cost (which also can be referred to as molecular cost) corresponding to each arrangement of the complex predicates can be calculated according to query results and the execution structure cost (ΔTi). That is to say, with respect to each arrange sequence of the complex predicates Cpred1 to Cpred5 in the above example, a corresponding overall execution structure cost is calculated. Here, the query result comprises all data records (rows) satisfying the query in the data object (e.g. table) to which the first query statement is directed.

In a particular implementation according to one embodiment, a complex predicate bitmap matrix (B) can be generated in association with the complex predicates according to the query result. Moreover, the overall execution structure cost of each arrangement of the complex predicates can be calculated according to the execution structure cost and the complex predicate bitmap matrix. More specifically, for example, as for the aforementioned example of executing query with respect to the trunk and with respect to the respective combination of each of the complex predicates with the trunk, the query result of respective combination of each complex predicate with the trunk can be qualified with respect to the query result of the trunk, thereby generating a first dimension vector (Bfi), which is corresponding to the respective complex predicate, in the complex predicate bitmap matrix, as will be described below in detail with reference to FIG. 2.

As for the query statement Q1 in FIG. 2, the query result corresponding to the trunk is "1, 2, 3, 4, 5, 6, 7, 8". The query result corresponding to the combination of the complex predicate Cpred1 with the trunk is "2, 3, 4, 6, 8". Note that, the collection of a query result corresponding to the combination of a complex predicate Cpredi with the trunk may be equal to or can be included in the corresponding query result of the trunk. Therefore, in an implementation, these two query results can be aligned, so as to facilitate the subsequent operation and operation. For example, in the collection of "1, 2, 3, 4, 5, 6, 7, 8", "2, 3, 4, 6, 8" are retrieved (i.e. qualified) by the combination of the trunk and the complex predicate Cpred1, while "1, 5, 7" are not retrieved, whereby a row vector Bfi=[0 1 1 1 0 1 0 1] corresponding to the complex predicate Cpred1 is generated. Each member of this row vector corresponds to one item of the query result of the trunk (i.e. one data record (row) in the database object (table)), and has a value of 0 or 1 (i.e. each member has one bit). In some implementations, the value 1 is defined to indicate that a member in the query result of the trunk, which corresponds to the column on which this value is located, is retrieved by the complex predicate corresponding to the row on which this value is located; and the value 0 is defined to indicate that a member in the query result of the trunk, which corresponds to the column on which this value is located, is not retrieved by the complex predicate corresponding to the row on which this value is located. Although herein the value 1 is used for indicating being retrieved, the value 0 also can be used for indicating being retrieved while 1 is used for indicating being filtered (being not retrieved). In addition, although description is made herein using columns and rows, it should be understood that rows and columns can be interchanged. Thus, rows and columns can be referred to as a first dimension and a second dimension, respectively.

Figure 4:
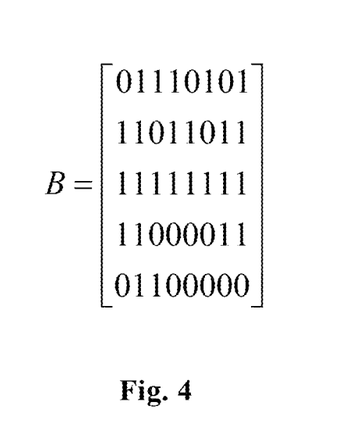
FIG. 4 depicts an exemplary embodiment illustrating a complex predicate matrix according to one embodiment.

Those row vectors corresponding to other complex predicates Cpred2 to Cpred5 shown in FIG. 2 can be similarly obtained, thereby generating a complex predicate bitmap matrix (B) corresponding to the complex predicates, as shown in FIG. 4. The sequence of the row vectors in the matrix B corresponds to the sequence of the complex predicates. Thus, as for different arrangements (i.e. different sequences) of the complex predicates, the corresponding matrixes thereto can be obtained by shifting the row vectors of the matrix correspondingly.

Alternatively, in the above-mentioned example of executing a query with respect to the first query statement itself (i.e. applying the first query statement to each data record (row) of the database object), second dimension vectors (Bsi), each of which corresponding to a data record which satisfies the trunk, in the complex predicate bitmap matrix, can be generated based on whether or not the data record satisfies the respective complex predicates, as will be specifically described below with reference to FIG. 3.

In the query statement Q2 shown in FIG. 3, from the query "Select (*) from Tab", it can be seen that the data record in the table includes ten items, "0, 1, 2, 3, 4, 5, 6, 7, 8, 9". The query result of the trunk is "1, 2, 3, 4, 5, 6, 7, 8". In operation, the query statement Q2 is applied to the first row ("0"), and it can be determined that this row does not satisfy the trunk and thus is filtered out. Next, as for the second row ("1"), this row satisfies the trunk, and then it is to determine whether or not this second row satisfies the respective complex predicates Cpred1 to Cpred5, thereby it can be determined that this second row satisfies the complex predicates Cpred2 to Cpred4 but does not satisfy the complex predicates Cpred1 and Cpred5. Thus, a column (second dimension) vector Bs1 of the complex predicate bitmap matrix B corresponding to this row, which is the second row in the table but a first row in the rows that satisfy the trunk, is obtained as:

$$Bs_1 = \begin{bmatrix} 0 \\ 1 \\ 1 \\ 1 \\ 0 \end{bmatrix}$$

The respective column (second dimension) vectors Bsj of the complex predicate bitmap matrix B (and thus the complex predicate bitmap matrix B) can be obtained, as shown in FIG. 4.

Figure 5:
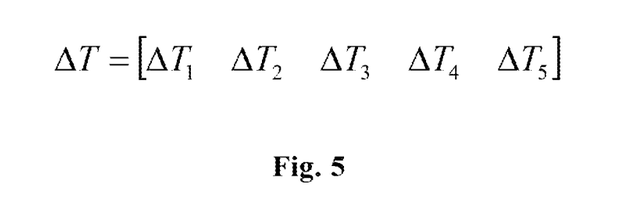
FIG. 5 depicts an exemplary embodiment for illustrating an executable structure cost vector according to one embodiment.

An overall execution structure cost T of each arrangement of the complex predicates can be calculated according to the execution structure cost $\Delta Ti$ and the complex predicate bitmap matrix B. For clarity, FIG. 5 illustrates the vector $\Delta T$ of the execution structure costs of the respective complex predicates:

$$\Delta T = [\Delta T_1 \, \Delta T_2 \, \Delta T_3 \, \Delta T_4 \, \Delta T_5]$$

Therefore, the overall execution structure cost T of each arrangement of the complex predicates can be calculated according to the execution structure cost $\Delta Ti$ and the complex predicate bitmap matrix B.

Figure 6:
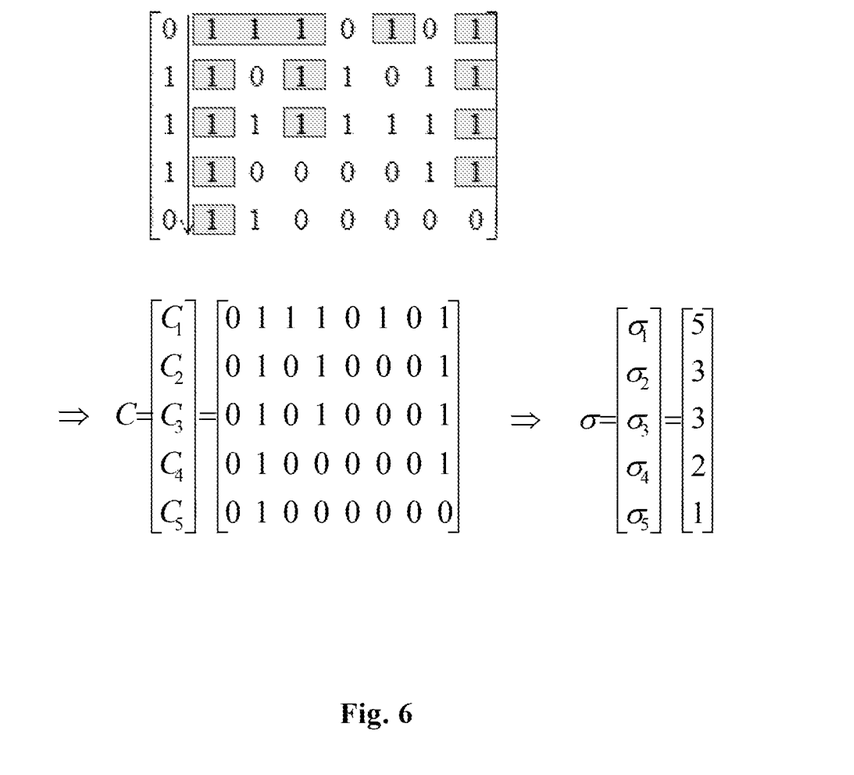
FIG. 6 depicts of an exemplary embodiment illustrating calculation of an overall execution structure cost according to an embodiment of the present disclosure.

As shown in FIG. 6, as for the arrangement of the complex predicates as shown in the above example, for example, [Cpred1 and Cpred2 and Cpred3 and Cpred4 and Cpred5] (in this example, the relation among the complex predicates is logic AND), there exists the following situation.

The row vector Bf1 corresponding to the complex predicate Cpred1 is [0 1 1 1 0 1 0 1] (which is the first row vector in the matrix B), and the row vector Bf1 also serves as the first row vector C1 in an intermediate result matrix C in FIG. 6. In the query result of the trunk, five data records (rows) are retrieved by the complex predicate Cpred1; therefore, in this row vector, there exist five respective members having a predetermined value (1). Thus, the structure cost corresponding to the complex predicate Cpred1 is $5 \times \Delta T1$.

The row vector Bf2 corresponding to the complex predicate Cpred2 is [1 1 0 1 1 0 1 1] (which is the second row vector in the matrix B). Thus, the query result corresponding to the combination of the trunk and the complex predicates Cpred1 and Cpred2 is "2, 4, 8", that is, it corresponds to a result vector [0 1 0 1 0 0 0 1] (the second row vector C2 in the intermediate result matrix C) resulting from logic AND operation of the row vector Bf2 and the first row vector C1 in the intermediate result matrix C (which is also equivalent to a logic AND operation of the row vector Bf2 and the row vector Bf1), as shown by the intermediate result matrix at the middle position of the upper portion of FIG. 6. That is to say, in the query result of the trunk and the complex predicate Cpred1, there are three data records (rows) that are retrieved by the complex predicate Cpred2. Thus, the structure cost corresponding to the complex predicate Cpred2 is $3 \times \Delta T2$.

Correspondingly, a result vector (the third row vector C3 in the intermediate result matrix C) [0 1 0 1 0 0 0 1] can be obtained by logic AND operation of the row vector Bf3 and the second row vector C2 in the intermediate result matrix C (which is also equivalent to a logic AND operation of row vector Bf3, row vector Bf2 and the row vector Bf1). Accordingly, the structure cost corresponding to the complex predicate Cpred3 is $3 \times \Delta T3$.

In such way, the fourth row vector C4 and the fifth row vector C5 in the intermediate result matrix C can be obtained. Accordingly, the structure cost corresponding to the complex predicate Cpred4 is $2 \times \Delta T4$, and the structure cost corresponding to the complex predicate Cpred5 is $1 \times \Delta T5$.

That is to say, with respect to each complex predicate starting from the second complex predicate in the current arrangement, a respective logic operation is performed on the first dimension vectors corresponding to this complex predicate and all the complex predicates preceding this complex predicate, thereby obtaining a corresponding result vector based on the logic relation among this complex predicate and all the complex predicates preceding this complex predicate.

Here, the numbers of the members having a predetermined value (e.g., 1) in the result vector corresponding to a complex predicate and in the first one of the first dimension vectors are respectively defined as σi.

Figure 7:
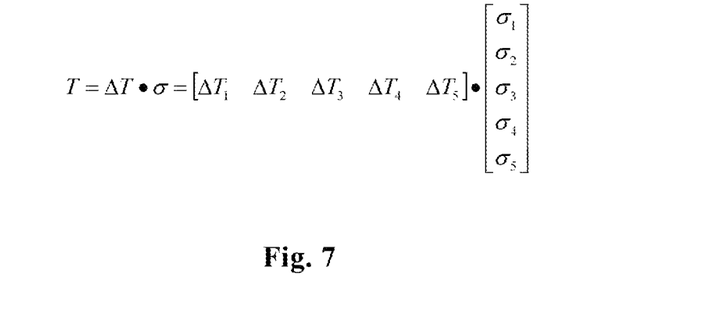
FIG. 7 depicts of an alternate exemplary embodiment illustrating calculation of an overall execution structure cost.

Thus, a sum of products of the execution structure cost ($\Delta Ti$) and the numbers (σi) of the members having a predetermined value can be calculated. Here, needless to say, i corresponds to a complex predicate, and is a natural number between 1 and the total number of the complex predicates (inclusive). In such way, the overall execution structure cost (T) corresponding to this arrangement can be obtained. For convenience of description, as shown in FIG. 7, this process is described as:

However, it should be understood that the present disclosure is not limited to vector operations. In some implementations of the present disclosure, the number (σi) of the members having the predetermined value is calculated, and at the same time, the sum of products of the calculated σi and the corresponding $\Delta Ti$ can be calculated. In this process, if the calculated sum of products of the generated σi and the corresponding $\Delta Ti$ is larger than a overall executive structure cost (T) of the arrangement which was previously calculated, the generation of the subsequent members (σi+1 . . . ) can be stopped and arrangement corresponding to this sum can be discarded.

It should be understood that the above mentioned process for calculating σi is just for exemplary purpose and not for limiting purpose. For example, for each first dimension vector (Bfi), such an operation, Bfi•Bfi−1• . . . •Bfi, can be performed, where the symbol "•" represents the logic AND operation of two vectors, thus the number (σi) of the members having the predetermined value in the result vector obtained can be calculated.

According to the above steps, the execution structure cost corresponding to each arrangement of the complex predicates can be obtained. It should be noted that the manners for calculating the execution structure cost corresponding to each arrangement of the complex predicates are various according to the disclosure of the present disclosure, and should not be limited to the above descriptions.

In step S105, an arrangement having the lowest overall execution structure cost T is selected for optimizing database query. According to a more particular implementation of the present disclosure, the arrangement having the lowest overall execution structure cost, and optionally one or more of a complex predicate bitmap matrix corresponding to the arrangement, logic relations among the respective complex predicates, and execution structure cost of each complex predicate can be used as at least a portion of history feedback information associated with the first query statement.

In addition, the history feedback information can be stored in a memory. The memory can be located within the database, or can be located outside the database and operatively coupled to the database engine. Here, it needs to be noted that even for a million intermediate data records (e.g. search results for the trunk), only a memory space of 100 k is required for storing the complex predicate bitmap matrix. Thus, according to the present disclosure, it is possible to enhance query efficiency with minimum cost.

According to the one embodiment, since the history feedback information at least comprises an arrangement of the complex predicates having the lowest overall executive structure cost, the first query statement can be re-written using the feedback information, thereby the optimization of query statement can be achieved and the execution cost can be reduced. For example, the aforementioned external tool can generate a rewrite-optimized first query statement according to the method of the present disclosure, for being executed by the database engine. Alternatively, for example, as for a situation where the database engine performs a query for the first query statement itself, the rewriting of the first query statement can be directly applied to an execution structure for the first query statement; thereby an optimized execution structure can be obtained without re-binding process. This is advantageous in some situations. For example, the lately executed first query statement and its execution structure as well as the corresponding page may be stored in the buffer repository of the database engine. Thus, at the time when the first query statement is received once again, query can be performed using the optimized execution structure, which can reduce the executive cost.

Although vector $\Delta T$ herein is shown as a row vector, the present disclosure is not limited thereto. In addition, the vector operation herein is shown only for the purpose of illustration and the present disclosure is also not limited to vector operation.

Figure 8:
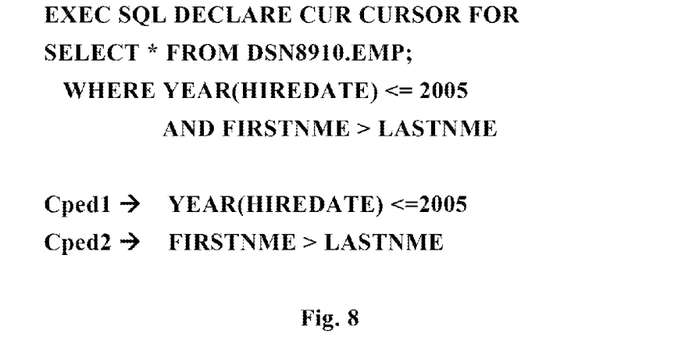
FIG. 8 depicts an example for illustrating a database query statement according to one embodiment.

FIG. 8 illustrates an example of a database query statement according to the present disclosure, wherein, the complex predicate Cpred1 is YEAR (HIREDATE)<=2005, and the complex predicate Cpred2 is FIRSTNME>LASTNME.

Figure 9:
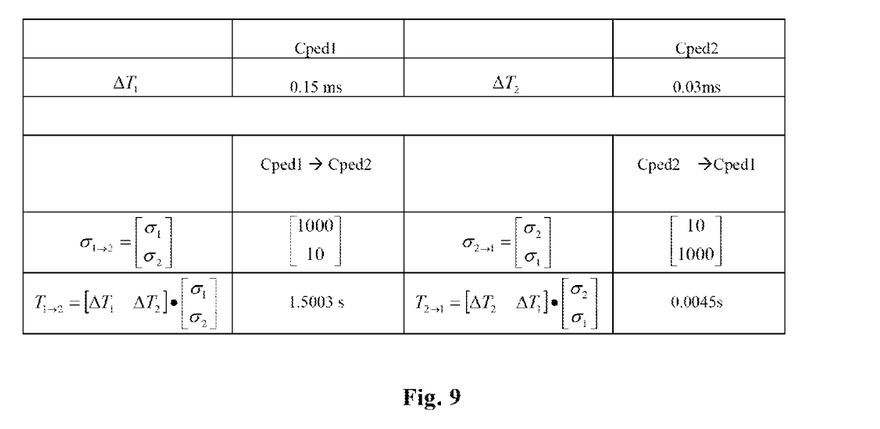
FIG. 9 depicts a sample view illustrating applying the methodology according to embodiment of FIG. 8.

FIG. 9 illustrates a view of applying the method of the present disclosure to the example shown in FIG. 8. For this exemplary query statement, the execution structure cost corresponding to the complex predicate Cpred1 is 0.15 ms, while the execution structure cost corresponding to the complex predicate Cpred2 is 0.03 ms. In the case where Cpred1 and Cpred2 are executed in turn (Cpred1→Cored2, i.e., arrangement-1), while, in the case where Cpred2 and Cpred1 are executed in turn (Cpred2→Cpred1, i.e., arrangement-2). Thus, the overall execution structure costs respectively corresponding to the arrangement-1 and the arrangement-2 as obtained by calculation are: and, respectively. Therefore, the arrangement-2 (Cpred2→Cpred1) has the lowest execution cost, and this arrangement-2 together with other corresponding feedback information (e.g. complex predicate bitmap matrix, or the like) can be used as at least a portion of the history feedback information for optimization. FIG. 10 illustrates an optimization result of the query statement.

Figure 11:
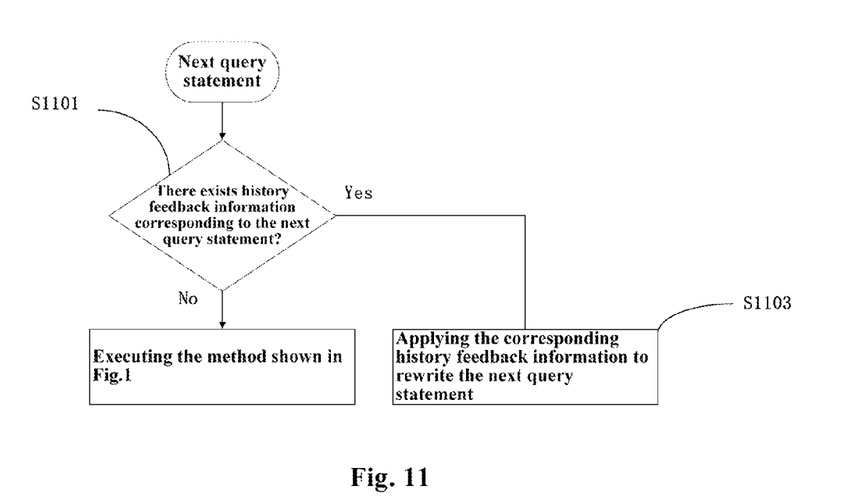
FIG. 11 depicts a schematic flowchart according to an alternate embodiment.

FIG. 11 illustrates a schematic flowchart of a method according to another embodiment of the present disclosure. According to the present disclosure, it is also possible to receive a next query statement (e.g. a second query statement). In step S1101, it is determined whether or not there exists history feedback information corresponding to the second query statement. For example, in a particular implementation, if the trunk of the second query statement is consistent with the trunk of the previously executed query statement and the complex predicates of the second query statement are consistent with the complex predicates of the previously executed query statement or include the complex predicates of the previously executed query statement, it can be determined that there exists history feedback information corresponding to the second query statement. If it is determined that there exists history feedback information corresponding to the second query statement, this corresponding history feedback information is applied in step S1103 to optimize, for example, rewrite, the second query statement. If it is determined that there does not exist history feedback information corresponding to the second query statement, the aforementioned method with respect to the first query statement can be performed for the second query statement.

It will be understood that as for a situation where the second query statement is consistent with the previously executed query statement (e.g. the first query statement) to which the history feedback information corresponds (or, with the semantic transformation also being considered), that is, a situation where the trunks and the complex predicates of the first and second query statements are consistent (equivalent), the second query statement can be re-written directly using the arrangement.

As for a situation where the trunks are consistent and the complex predicates of the second query statement include the complex predicate of the previously executed query statement, it may be such a case, for example, where the second query statement is "Select (*) from Tab Where Cpred1 and Cpred2 and Cpred3 and Cpred4 and Cpred5 and Cpred6". That is to say, compared to the aforementioned example, a complex predicate Cpred6 is added. As for this situation, for example, this statement can be rewritten directly using a corresponding arrangement, because the optimized arrangement of the preceding five complex predicates can be known from the corresponding history feedback information. Alternatively, the aforementioned method can be performed with respect to the complex predicate Cpred6, for example, a query for a combination of the trunk and the Cpred6 can be executed so as to obtain the corresponding execution structure cost $\Delta T6$ and the row vector Bf6 of the corresponding bitmap matrix, and then a bitmap matrix corresponding to the second query statement can be obtained in combination with the bitmap matrix B in the corresponding history feedback information, the bitmap matrix corresponding to the second query statement can have a total of six row vectors: Bf6 and five row vectors in the bitmap matrix B in the history feedback information), and thus an arrangement having the lowest execution structure cost with respect to the six complex predicates of the second query statement can be obtained.

Figure 12:
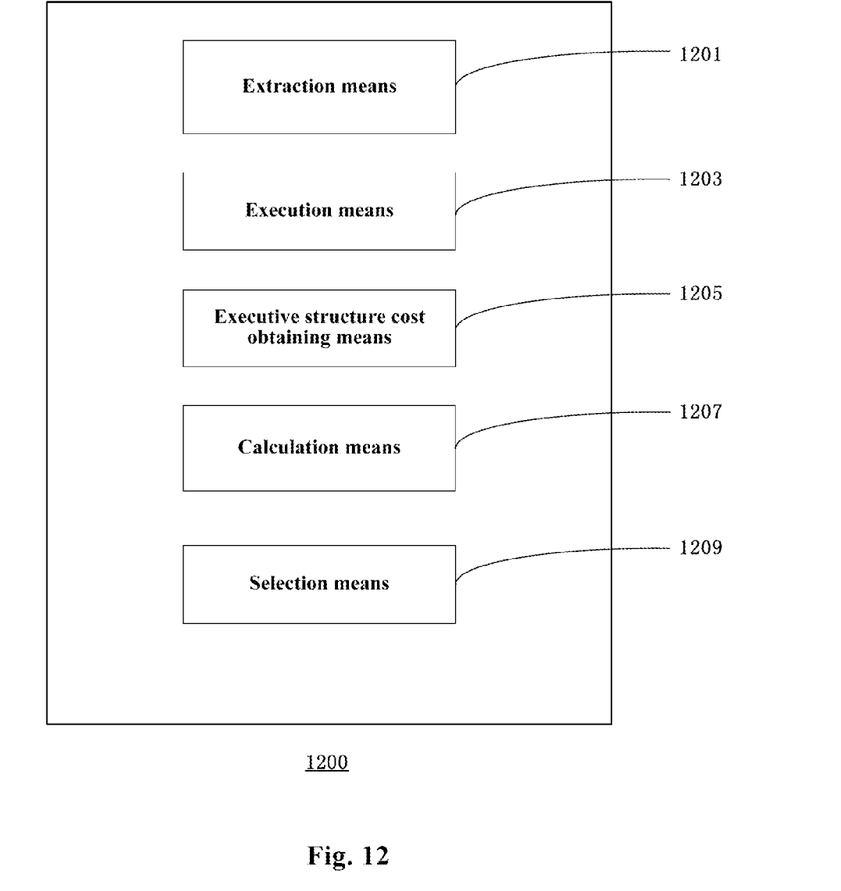
FIG. 12 depicts a block diagram showing a system for database optimization according to one embodiment.

FIG. 12 illustrates a system 1200 for database optimization according to an embodiment of the present disclosure. The system 1200 comprises: extraction means 1201 configured to extract complex predicates from a first query statement; execution means 1203 configured to execute a query associated with said first query statement; execution structure cost obtaining means 1205 configured to obtain an execution structure cost ($\Delta Ti$) for each complex predicate; calculation means 1207 configured to calculate an overall executive structure cost corresponding to each arrangement of the complex predicates according to query results and said execution structure cost ($\Delta Ti$); and selection means 1209 configured to select an arrangement having the lowest overall executive structure cost for database query optimization.

Preferably, the query statement may comprise at least two complex predicates. The remaining part of the query statement after the extraction means 1201 extracts the complex predicates is referred to as a trunk. The execution means 1203 can be configured to execute any one of the following: queries with respect to the trunk and with respect to the respective combination of each of the complex predicate with the trunk; and a query with respect to the query statement itself. The execution structure cost obtaining means 1205 can be configured to execute any one of the following: estimating the executive structure cost based on the execution structure used for the query associated with the query statement; and obtaining the executive structure cost based on the execution of the query associated with the query statement. The calculation means 1207 can be configured to: generate a complex predicate bitmap matrix (B) in association with the complex predicates based on the result of the query, wherein the complex predicate bitmap matrix has a first dimension and a second dimension; and, calculate the overall execution structure cost for each arrangement of the complex predicates according to the execution structure cost and the complex predicate bitmap matrix. The system also can comprise storage means for storing the history information. The system can further comprise storage means for storing the history feedback information. The system can further comprise means for rewriting the query statement according to the history feedback information. The system can further comprise: means for receiving a next query statement; means for determining whether or not there exists history feedback information corresponding to the next query statement; and means for applying corresponding history feedback information to rewrite the next query statement if the corresponding history feedback information exists.

Figure 13:
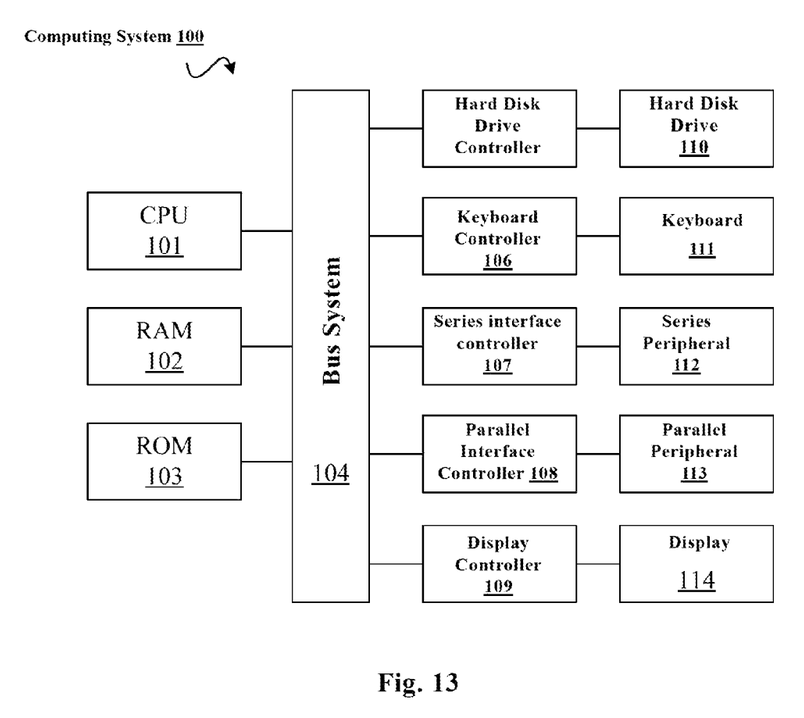
FIG. 13 is a schematic illustration of an exemplary computer system according to one embodiment.

FIG. 13 illustrates an exemplary computer system 100 which is applicable to implement the embodiments of the present disclosure. 'As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present disclosure. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for database query optimization, comprising:
   extracting complex predicates from a query statement, the query statement having at least two complex predicates, wherein a part of the query statement remaining after the complex predicates are extracted is a trunk;
   executing a query associated with the query statement;
   obtaining a respective execution structure cost ($\Delta T_i$) for each of the complex predicates;
   calculating an overall execution structure cost corresponding to each arrangement of the complex predicates according to a result of the query and the execution structure costs ($\Delta T_i$); and
   optimizing a database query by selecting the arrangement of complex predicates having a lowest overall execution structure cost.

2. The method according to claim 1, wherein the executing a query statement comprises executing a plurality of queries with respect to the trunk and with respect to a respective combination of each complex predicate with the trunk.

3. The method according to claim 1, wherein the executing a query statement comprises executing another query with respect to the query statement itself.

4. The method according to claim 1, wherein the calculating an overall execution structure cost corresponding to each arrangement of the complex predicates comprises estimating the execution structure cost based on an execution structure for the query associated with the query statement and wherein at least a portion of history feedback information associated with the query statement is obtained by storing the arrangement having the lowest overall execution structure cost and its corresponding complex predicate bitmap matrix and respective executive structure cost of each of the complex predicates.

5. The method according to claim 4, further comprising:
rewriting the query statement according to the history feedback information;
receiving a next query statement;
determining whether or not there exists history feedback information corresponding to the next query statement; and
applying the corresponding history feedback information to rewrite the next query statement upon determination that the corresponding history feedback information exists.

6. The method according to claim 1, wherein the calculating an overall execution structure cost corresponding to each arrangement of the complex predicates comprises obtaining the execution structure cost based on execution of the query associated with the query statement.

7. The method according to claim 1, further comprising
generating a complex predicate bitmap matrix (B) in association with the complex predicates according to a result of the query, wherein the complex predicate bitmap matrix has a first dimension and a second dimension; and
calculating an overall execution structure cost for each arrangement of the complex predicates, according to the execution structure costs ($\Delta T_i$) and a complex predicate bitmap matrix.

8. The method according to claim 7, wherein the executing a query associated with the query statement further comprises:
executing another query with respect to the query statement itself; and
generating a complex predicate bitmap matrix in association with the complex predicates according to result of the query;
generating respective members of a second dimension vector ($Bs_j$) corresponding to each of the data records which satisfy the trunk, in the complex predicate bitmap matrix, according to whether or not the data record satisfies the respective complex predicates.

9. The method according to claim 1 wherein the executing a query associated with the query statement comprises:
executing queries with respect to the trunk and with respect to respective combinations of each complex predicate with the trunk; and
generating a complex predicate bitmap matrix (B) in association with the complex predicates according to a result of the query; and
qualifying a query result of the respective combination of each complex predicate with the trunk, relative to query result of the trunk, thereby generating a first dimension vector ($Bf_i$) corresponding to the complex predicate in the complex predicate bitmap matrix.

10. The method according to claim 9, wherein each member of the complex predicate bitmap matrix has a value of 0 or 1, and
wherein the value 1 indicates that a member in the query result of the trunk, is retrieved by a complex predicate corresponding to a first dimension on which the member of the complex predicate bitmap matrix is located; and
wherein the value 0 indicates that a member in the query result of the trunk, is not retrieved by a complex predicate corresponding to the first dimension on which the member of the complex predicate bitmap matrix is located.

11. The method of claim 10, wherein a value of 1 corresponds to a second dimension on which the member of the complex predicate bitmap matrix is located, and a value of 0 corresponds to the second dimension on which the member of the complex predicate bitmap matrix is located, 12. The method according to claim 1, wherein the execution structure cost comprises a response time of applying the complex predicate to one data record of a specific database object.

13. A system for database query optimization, comprising:
a memory device having computer readable computer instructions; and
a processor for executing the computer readable instructions, the instructions including:
extracting complex predicates from a query statement, the query statement comprising at least two complex predicates, wherein a part of the query statement remaining after the complex predicates are extracted is a trunk;
executing a query associated with the query statement;
obtaining a respective execution structure cost ($\Delta Ti$) of each complex predicate;
calculating an overall execution structure cost corresponding to each arrangement of the complex predicates according to results of the query and the execution structure costs ($\Delta Ti$); and
selecting an arrangement having the lowest overall execution structure cost for optimizing database query.

14. The system according to claim 13, wherein the execution structure cost for each of the complex predicates is based on an execution structure used for the query associated with the query statement.

15. The system according to claim 13, wherein the calculating an overall execution structure cost corresponding to each arrangement of the complex predicates comprises obtaining the execution structure cost based on execution of the query associated with the query statement.

16. The system according to claim 13, wherein the instructions further include generating a complex predicate bitmap matrix (B) in association with the complex predicates according to a result of the query, wherein, the complex predicate bitmap matrix has a first dimension and a second dimension, and
calculating an overall execution structure cost for each arrangement of the complex predicates, according to the execution structure costs and the complex predicate bitmap matrix.

17. The system according to claim 16, wherein each member of the complex predicate bitmap matrix has a value of 0 or 1, and
wherein the value 1 indicates that a member in the query result of the trunk, which corresponds to the second dimension on which the member of the complex predicate bitmap matrix is located, is retrieved by a complex predicate corresponding to the first dimension on which the member of the complex predicate bitmap matrix is located, and the value 0 indicates that a member in the query result of the trunk, which corresponds to the second dimension on which the member of the complex predicate bitmap matrix is located, is not retrieved by a complex predicate corresponding to the first dimension on which the member of the complex predicate bitmap matrix is located.

18. The system according to claim 13 wherein the instructions further include:

rewriting the query statement according to the history feedback information;

receiving a next query statement;

determining whether or not there exits history feedback information corresponding to the next query statement; and applying the corresponding history feedback information to rewrite the next query statement upon determination that the corresponding history feedback information exists.

19. A computer program product for database query optimization, the computer program product comprising a non-transitory computer readable storage medium having computer readable program code embodied therewith, said computer readable program code being executable by a processor to:

extract complex predicates from a query statement, the query statement having at least two complex predicates, wherein a part of the query statement remaining after the complex predicates are extracted is a trunk;

execute a query associated with the query statement;

obtain a respective execution structure cost ($\Delta T_i$) for each of the complex predicates;

calculate an overall execution structure cost corresponding to each arrangement of the complex predicates according to results of the query and the execution structure costs ($\Delta T_i$); and optimize a database query by selecting the arrangement of complex predicates having a lowest overall execution structure cost.

* * * * *